United States Patent [19]
Nomura et al.

[11] Patent Number: 5,510,868
[45] Date of Patent: Apr. 23, 1996

[54] ZOOM LENS CAMERA HAVING APERTURE SIZE CHANGING MECHANISM

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 358,758

[22] Filed: Dec. 19, 1994

[30] Foreign Application Priority Data

Dec. 24, 1993 [JP] Japan ................... 5-69391 U

[51] Int. Cl.$^6$ ............................................. G03B 19/02
[52] U.S. Cl. ............................... 354/208; 354/187
[58] Field of Search .................. 354/195.11, 208, 354/187

[56] References Cited

U.S. PATENT DOCUMENTS

| | | |
|---|---|---|
| 3,978,503 | 8/1976 | Shono . |
| 4,890,133 | 12/1989 | Ogawa et al. . |
| 4,944,030 | 7/1990 | Haraguchi et al. . |
| 4,987,436 | 1/1991 | Misawa . |
| 5,153,626 | 10/1992 | Yamamoto . |
| 5,335,031 | 8/1994 | Ogawa . |
| 5,367,351 | 11/1994 | Suzuka . |

Primary Examiner—Monroe H. Hayes
Attorney, Agent, or Firm—Greenblum & Bernstein

[57] ABSTRACT

A camera having a zoom lens barrel that includes an aperture size changing mechanism including a pair of light intercepting members which are inserted into a retracted from a rectangular-shaped photographing aperture of the camera for changing the photographing aperture size. The camera further includes a non-rotational cylinder which moves in the direction of the optical axis of the zoom lens without rotating. A rotational cylinder is also included and is driven to rotate with respect to the non-rotational cylinder about the optical axis. A gear supporting member is supported on the non-rotational cylinder. The gear supporting member includes a raised portion projecting toward the photographing aperture. The camera further includes a gear train which is supported on the gear supporting member for transmitting a drive force to the rotational cylinder. At least a part of the gear train is supported by the raised portion, which is formed such that the orthographic projection thereof may not overlap the pair of light intercepting members in the optical axis direction.

8 Claims, 11 Drawing Sheets

ZOOM LENS CAMERA HAVING APERTURE SIZE CHANGING MECHANISM

BACKGROUND OF THE INVENTION

1. Field of the Invention

The present invention relates to a zoom lens camera having an aperture size changing mechanism with which a photographer can freely and easily select a desired photographing aperture size among more than one predetermined aperture sizes, for instance, a standard size and a panoramic size.

2. Description of the Related Art

In many recent compact cameras having a zoom lens, one or more than one zoom lens barrel projects from the camera body when in use and is retracted and stowed (i.e. stored) in the camera body when not in use for the purpose of making the thickness of the camera small, which contributes to a small camera size.

This type of compact zoom camera having an aperture size changing mechanism is well known. With the aperture size changing mechanism, upper and lower predetermined portions of the photographing aperture are covered or uncovered by a pair of light intercepting plates so as to selectively change the effective size of the aperture. For instance, a standard size (24 mm×36 mm) is selected when a pair of light intercepting plates uncover the upper and lower port ions of the photographing aperture, and a panoramic size (13 mm×36 mm) is selected when a pair of light intercepting plates cover the upper and lower portions of the photographing aperture.

On the other hand, in this type of compact zoom camera having an aperture size changing mechanism, if the zoom lens barrel is a telescoping-type zoom lens barrel including more than one movable barrel, more than two movable barrels in particular, a gear mechanism is usually provided to drive the zoom lens barrel. A part of the gear mechanism may prevent the camera from being compact because the gear mechanism may interfere with the aperture size changing mechanism.

SUMMARY OF THE INVENTION

The primary object of the present invention is to provide a zoom lens camera having an aperture size changing mechanism and a gear mechanism for driving the zoom lens that makes it possible to make the thickness of the camera quite small, i.e., to make the camera quite compact when the camera is not in use.

According to one aspect of the present invention, there is provided a camera having a zoom lens barrel which includes an aperture size changing mechanism including a pair of light intercepting members which are inserted into and retracted from a rectangular-shaped photographing aperture of the camera for changing a photographing aperture size; a non-rotational barrel which moves in a direction of an optical axis of the zoom lens without rotating; a rotational barrel which is driven to rotate with respect to the non-rotational barrel about the optical axis; and gear supporting member which is secured at the rear end of the non-rotational barrel, in which the gear supporting member has a central opening and a raised portion projecting toward the photographing aperture. The raised portion is formed such that an orthographic projection thereof in the optical axis direction may not overlap the pair of light intercepting members. A gear train is provided for transmitting a drive force to the rotational barrel, wherein at least a part of the gear train is supported by said raised portion.

Preferably, the gear supporting member includes a pair of long edges and a pair of short edges which form the opening. The pair of long edges and the pair of short edges correspond to a pair of long edges and a pair of short edges of the photographing aperture, wherein the part of the gear train is supported along either of the pair of short edges of the gear supporting member.

Preferably, the gear supporting member includes a pair of recessed portions for allowing the pair of light intercepting members to be in and out of the recessed portions so that the pair of light intercepting members may not bump against the gear supporting member. The raised portion is formed on the gear block between the pair of recessed portions.

Preferably, the raised portion has a space therein, the part of the gear train being supported in the space.

Preferably, the camera further includes a male helicoid gear and a female helicoid gear formed on an outer periphery of the rotational barrel and an inner periphery of the non-rotational gear, respectively. The male helicoid gear engages with the female helicoid gear.

According to another aspect of the present invention, there is provided a lens-shutter type camera having a zoom lens incorporated therein, which includes an aperture size changing mechanism including a pair of light intercepting members which are inserted into and retracted from a photographing aperture of the camera for changing a photographing aperture size; and, a zoom lens barrel moving in a direction of an optical axis of the zoom lens between an extended position and a retracted position. The zoom lens barrel further comprising a non-rotational barrel moving in the optical axis direction without rotating with respect to the camera, a rotational barrel driven to rotate with respect to the non-rotational barrel about the optical axis, a gear supporting member fixed to the rear end of the non-rotational barrel, and a gear train supported on the gear supporting member for transmitting a drive force to the rotational barrel. At least a part of the gear train is supported in a raised portion formed on the gear supporting member, in which the raised portion projects toward the photographing aperture so that the raised portion may not bump against the pair of light intercepting members when the zoom lens barrel retracts to the retracted position.

Preferably, the raised portion and the pair of light intercepting members is placed in a common imaginary plane perpendicular to the optical axis when the zoom lens barrel is placed at the retracted position.

The present disclosure relates to subject matter contained in Japanese Utility Model Application No. 5-69391 (filed on Dec. 24, 1993) which is expressly incorporated herein by reference in its entirety.

BRIEF DESCRIPTION OF THE DRAWINGS

The present invention will be described in detail with reference to the accompanying drawings in which.

DETAILED DESCRIPTION OF THE PREFERRED EMBODIMENTS

In this embodiment, a zoom lens optical system includes a front lens group L1 and a rear lens group L2. A focusing operation is carried out by the movement of the front lens group L1 as it travels in the direction of the optical axis 0 of the zoom lens optical system.

A fixed lens barrel 11 is integrally formed with the camera body and is provided with an inner barrel 11a and an outer barrel 11b. The rear ends of the inner barrel 11a and the outer barrel 11b are connected to each other through a connecting wall 11c, and the front ends of the barrels 11a and 11b are open. A rotational ring (or barrel) 12, which is inserted from the open end of the cylinders 11a and 11b, is rotatably mounted on the outer periphery of the inner barrel 11a. Three straight guide grooves 11e each extending in a direction parallel to the optical axis 0 are formed on the inner barrel 11a. Only one of the three straight guide grooves 11e is shown in FIG. 8.

Figure 1:
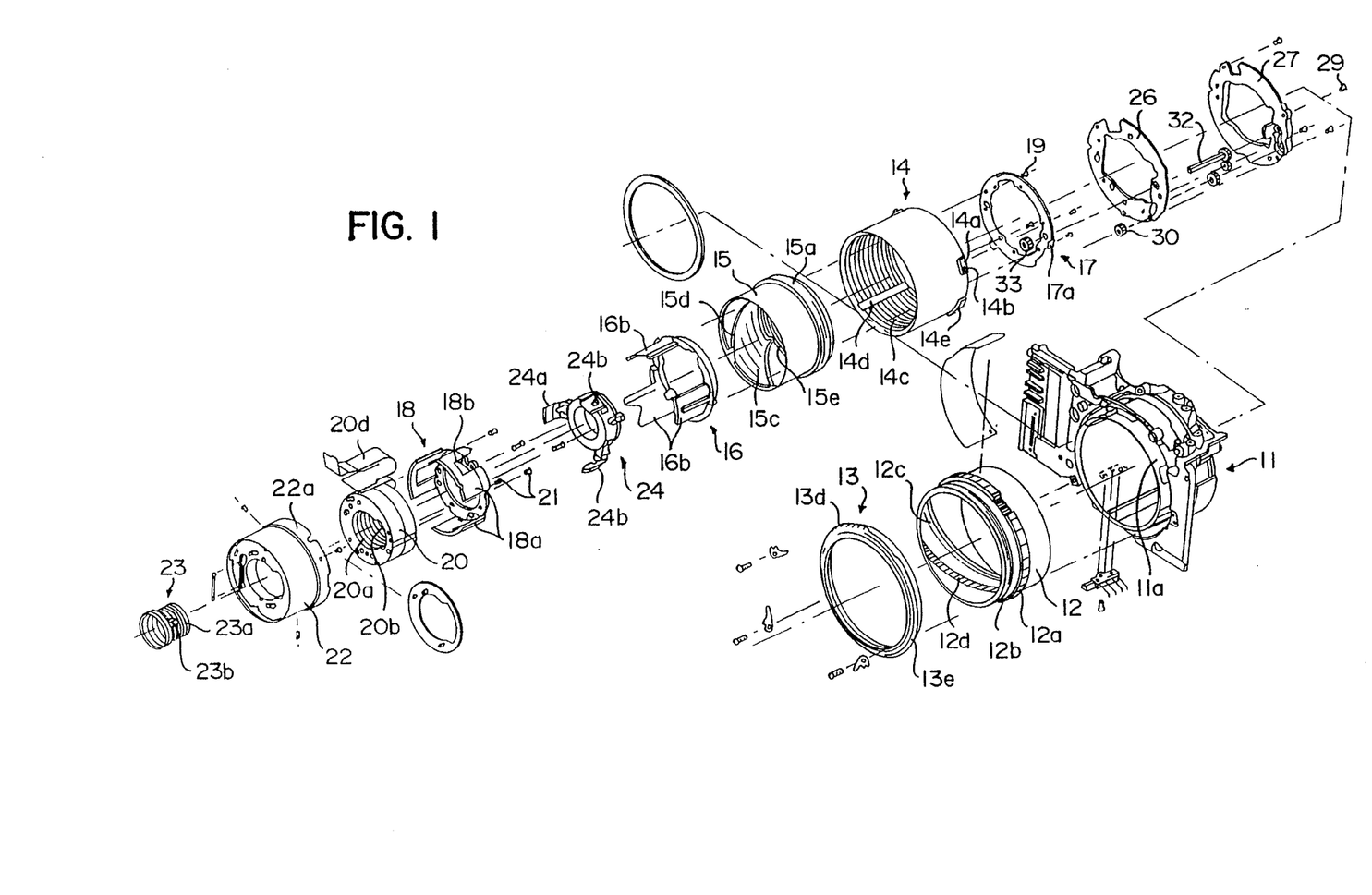
FIG. 1 is an exploded isometric view of a zoom lens barrel block according to an embodiment of the present invention.
Figure 2:
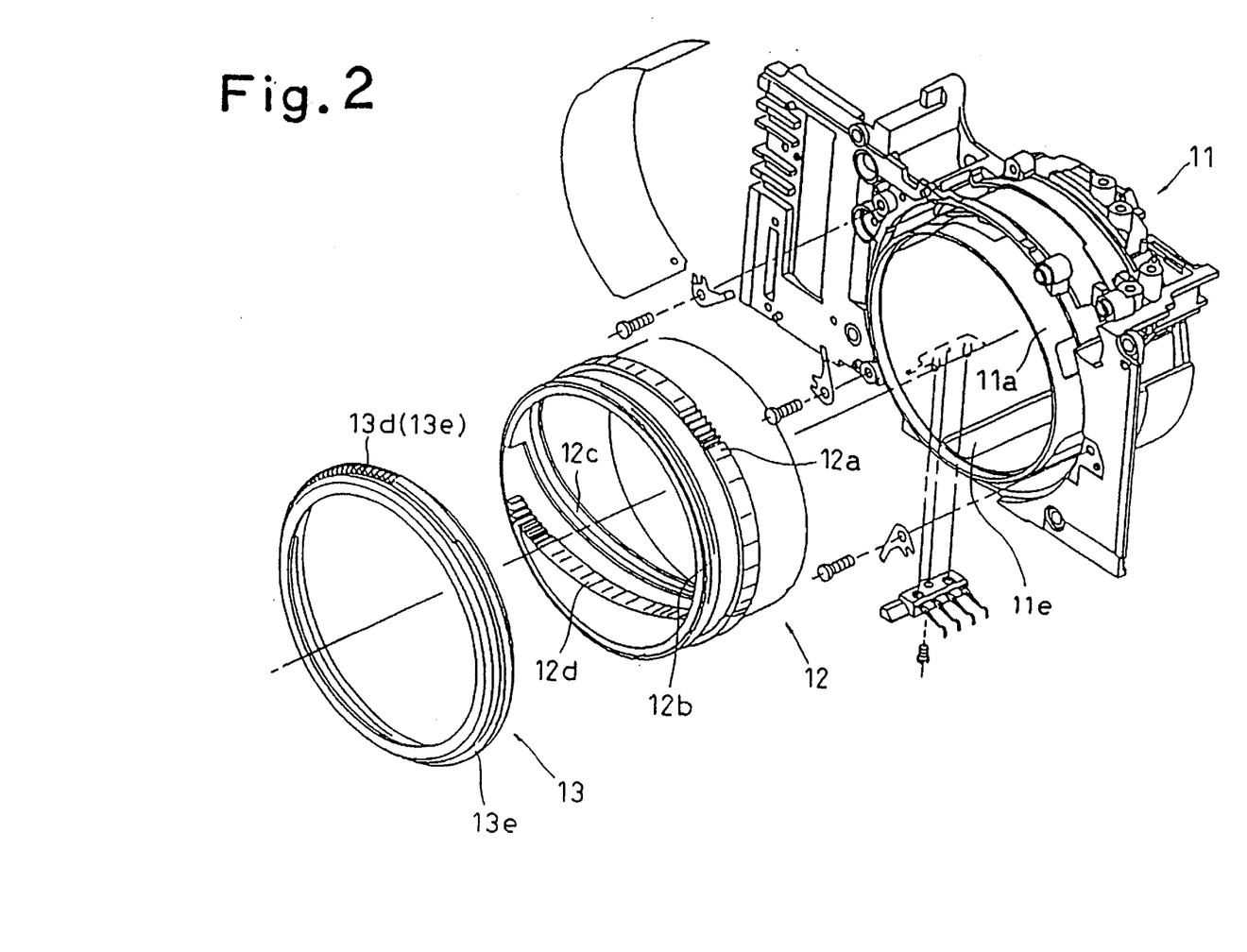
FIG. 2 is an enlarged isometric view of the rear portion of the zoom lens barrel block shown in FIG. 1.

A spur gear 12a is integrally formed with the rotational ring 12 on an outer periphery thereof, and a fine thread 12b is integrally formed with the rotational ring 12 at a tip of the outer peripheral portion thereof. On the inner wall of the rotational ring 12 are formed three lead grooves 12c parallel to one another and each inclined in the circumferential direction of the rotational ring 12, and an inclined inner gear 12d parallel to the lead grooves 12c. Only one of the three lead grooves 12c is shown in FIGS. 2 and 8.

A support ring 13 is secured to the front open end of the inner barrel 11a and outer barrel 11b of the fixed lens barrel 11. The support ring 13 includes a portion 13a engaging the inner surface of the outer barrel 11b; a thread portion 13b engaging the fine thread 12b; a portion 13c contacting an outer surface of the inner barrel 11a (see FIG. 7); and an outer flange 13e. The support ring 13 is biased toward the fixed lens barrel 11 by a spring mechanism (not shown) and is held at a predetermined position. Reference symbol 13d is a gear formed on an outer periphery of the support ring 13 for the adjustment of position of the rotational ring 12 in the direction of the optical axis 0. The support ring 13 also functions to strengthen the edge of the inner barrel 11a and the outer barrel 11b.

Figure 8:
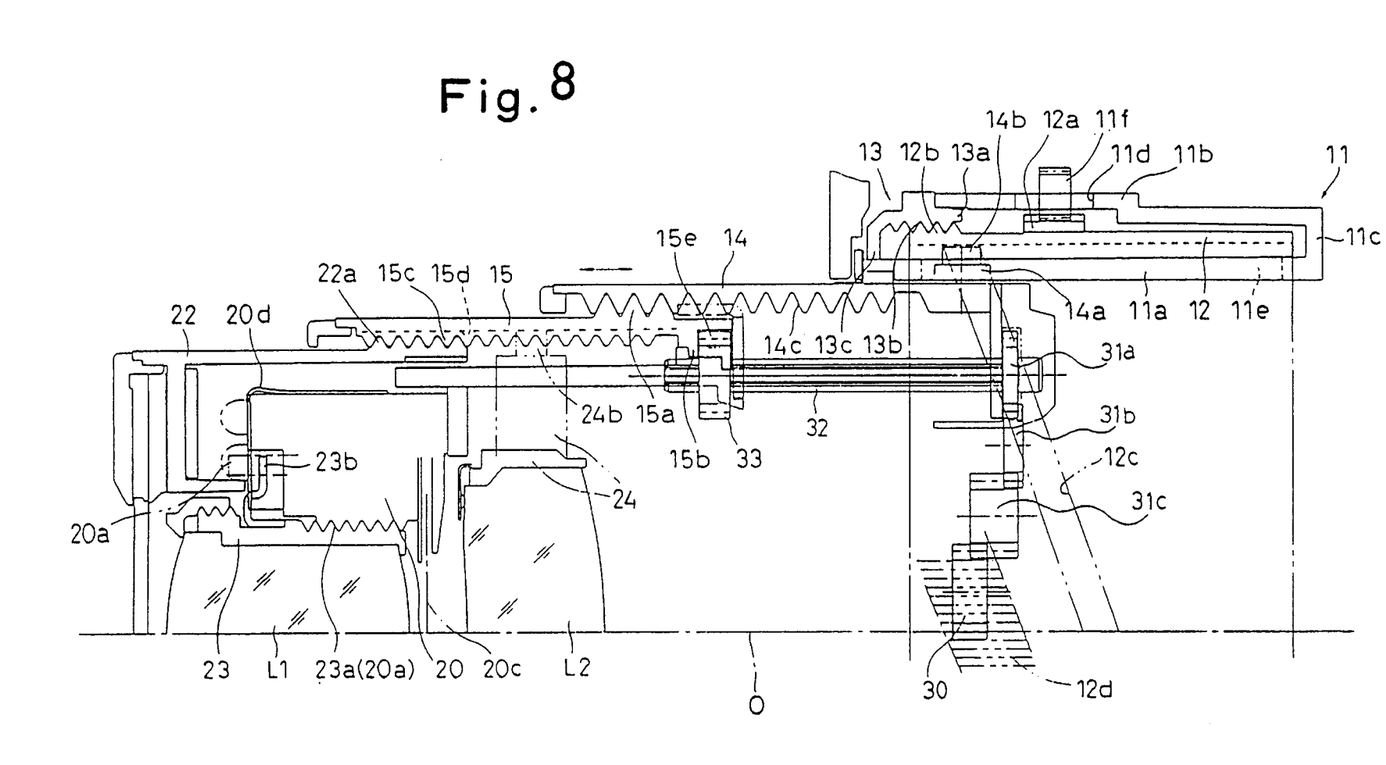
FIG. 8 is a lateral cross-sectional view of the upper half of the extended zoom lens barrel block according to the present invention.

As shown in FIG. 8, a notch 11d for allowing a drive pinion 11f to mesh with the spur gear 12a is provided on the outer barrel 11b of the fixed barrel 11, and other notches similar to the notch 11d are formed on the inner barrel 11a to expose the lead grooves 12c and the inclined gear 12d.

A first barrel (i.e., non-rotational barrel) 14 which moves in the direction of the optical axis 0 fits in the inner barrel 11a of the fixed lens barrel 11. Three straight guide projections 14a are formed integral with the outer periphery of the first barrel 14 and engage the guide grooves 11e of the fixed lens barrel 11. Only one of the three straight guide projections 14a is shown in FIG. 8. A pin 14b engaging the corresponding lead groove 12c of the rotational ring 12 is formed on each of the guide projections 14a. A female helicoid 14c and three straight guide grooves 14d parallel to the optical axis 0 are formed on the inner wall of the first barrel 14. Only one of the three straight guide grooves 14d can be seen in FIG. 3. With the construction described above, the rotation of the rotation ring 12 causes the first barrel 14 to move in the direction of the optical axis 0 without rotating by means of the guide grooves 11e and the lead grooves 12c.

Figure 7:
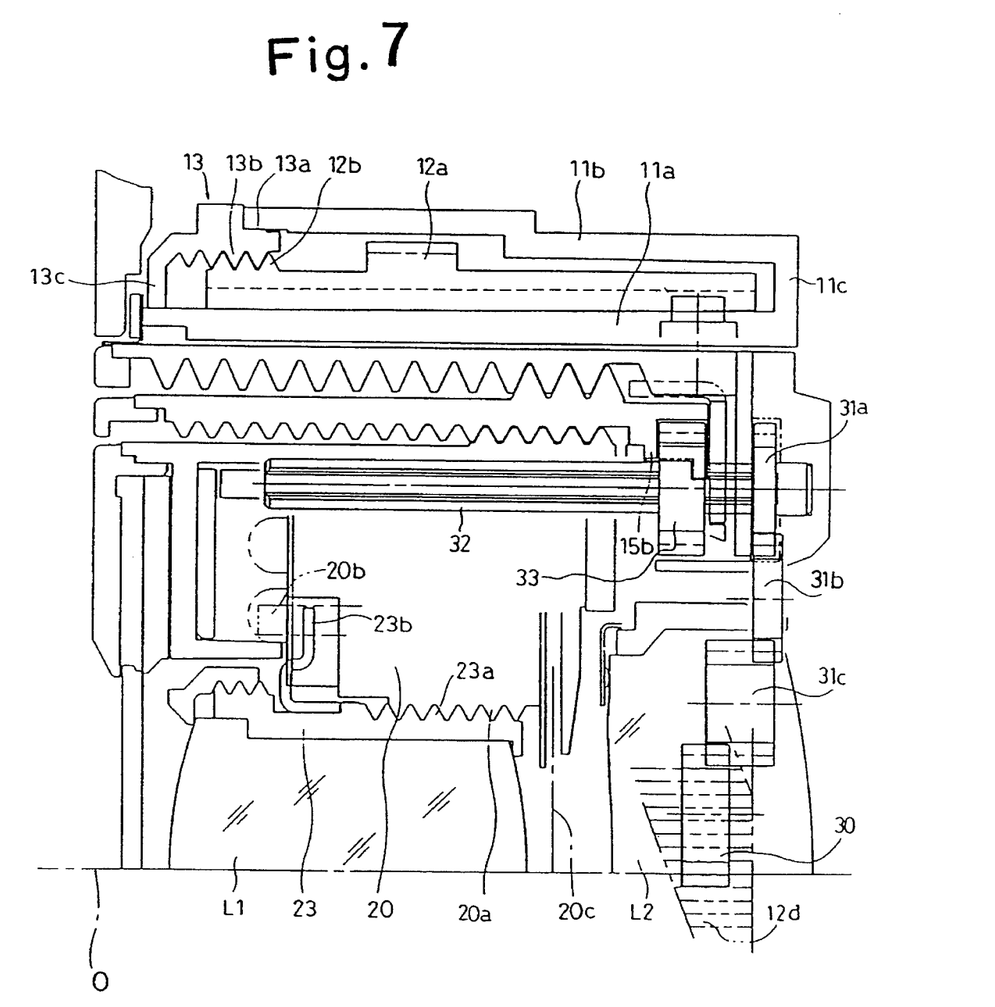
FIG. 7 is a lateral cross-sectional view of the upper half of the accommodated zoom lens barrel block according to the present invention.

Inside the first barrel 14 is accommodated a second barrel (i.e., rotational cylinder) 15, and at a rear portion of the outer periphery of the second barrel 15 is formed a male helicoid 15a which engages the female helicoid 14c of the first barrel 14. A straight guide member 16 is situated in the second barrel 15, and a straight guide plate 17 is fixed by fastening screws 19 to a rear end portion of the guide member 16. An inner flange 15b is integrally formed with the second barrel 15 between the straight guide member 16 and the guide plate 17 so as to rotate in relation to the guide member 16 and the guide plate 17 as illustrated in FIGS. 7 and 8. Three straight guide keys 17a are formed on the periphery of the guide plate 17 and engage the guide grooves 14d of the first barrel 14. As a result, the guide member 16 and the guide plate 17 rotate in relation to the second barrel 15 and they integrally move in the direction of the optical axis 0. In other words, the second barrel 15 is rotatable and movable in the direction of the optical axis 0 at the same time by means of the male and female helicoids 15a and 14c. Also, the guide member 16 and the guide plate 17 are movable together with the second barrel 15 in the direction of the optical axis 0 without rotating.

The guide member 16 is provided with three straight keys 16b each extending in a direction parallel to the optical axis 0. Three straight keys 18a are formed on a guide member 18 which guides the front lens group L1 in the direction of the optical axis 0. The straight keys 18a engage the straight keys 16b. A shutter block 20 is secured to the front lens group guide member 18 through the fastening screws 21 and is further secured to the front lens group supporting barrel 22. As a result, the shutter block 20 and the front lens group supporting barrel 22 are prevented from rotating and are allowed to move only in the direction of the optical axis 0.

The shutter block 20 is provided on its inner periphery with a female helicoid 20a extending parallel to the optical axis 0, and a male helicoid 23a of a front lens frame 23 is engaged with the female helicoid 20a. The shutter block 20, as is widely known, rotates the front lens frame 23 by means of the helicoids 20a and 23a through a driving pin 20b and a projection 23b in accordance with the subject distance signals from a distance measuring device (not shown), and then the shutter block 20 moves the lens frame 23 toward a focal point. At the rear end portion of the outer periphery of the front lens group supporting barrel 22, a male helicoid 22a is formed to move the front lens frame 23 in the direction of the optical axis 0 during a zooming operation. The shutter block 20 is provided with blades 20c, which open and close in accordance with the luminance signals of the subject. Driving signals are supplied to the shutter block 20 through a flexible printed circuit board (FPC board) 20d.

A rear lens group guiding slot 18b is formed on each of the straight keys 18a of the front lens group guide member 18 for linearly moving the rear lens group L2 in the direction of the optical axis 0. The rear lens group L2 is secured to the rear lens frame 24. Three straight keys 24a engaging the rear lens group guiding slots 18b are formed on the rear lens frame 24. A cam pin 24b is formed on each of the keys 24a so as to project in a radial direction therefrom.

A female helicoid 15c and three cam grooves 15d are formed on the inner periphery of the second barrel 15. The female helicoid 15c engages a male helicoid 22a of the front lens group supporting barrel 22, and the cam grooves 15d engage the cam pins 24b of the rear lens frame 24. The cam grooves 15d meet with the female helicoid 15c at the same position in the circumferential direction of the second barrel 15 such that a part of the female helicoid 15c is removed. When assembled, the cam pins 24b of the rear lens frame 24 are engaged with open grooves 22b of the front lens group supporting barrel 22. As such, the cam pins 24b are engaged with the cam grooves 15d and the male helicoid 22a is engaged with the female helicoid 15c. Under these conditions, the rotation of the second barrel 15 causes the front lens group supporting barrel 22 (front lens group L1) to linearly move in the direction of the optical axis 0 due to the relationships between the female helicoid 15c and the male helicoid 22, and between the keys 16b of the guide member 16 and the keys 18a of the front lens guide member 18. Further, the rotation of the second barrel 15 causes the rear lens frame 24 (rear lens group L2) to move along a predetermined path in the direction of the optical axis 0 due to the relationships between the cam grooves 15d and the cam pins 24b, and between the keys 24a of the rear lens frame 24 and the rear lens group guiding slots 18b of the front lens guide member 18 to thereby effect zooming.

As explained above, when the rotational ring 12 is driven, the first barrel 14 linearly moves in the direction of the optical axis 0, and when the second barrel 15 is rotated in relation to the first barrel 14, the second barrel 15 moves in the direction of the optical axis 0 while rotating. As a result, the front lens group L1 and the rear lens group L2 linearly move while the distance between the two lens groups changes to thereby effect zooming.

Next, a driving mechanism for the second barrel 15 will be explained. The driving mechanism transmits the rotation of the rotational barrel 12 to the second barrel 15. A pair of gear supporting plates 26 and 27 are secured to the rear end portion of the first barrel 14 through fastening screws 29. The pair of gear supporting plates 26 and 27 constitute a gear block. A pinion 30 engaging the inclined inner gear 12d of the rotational ring 12 is rotatably attached to the gear supporting plate 26. The pinion 30 is accommodated in a straight guide projection 14e having a space for the pinion therein, which is formed on a rear end of the first barrel 14. A part of the teeth of the pinion 30 accommodated in the space 14e projects from the outer periphery of the first barrel 14. The inclined inner gear 12d of the rotational ring 12 is parallel to the lead groove 12c, so that the engagement between the pinion 30 and the inclined inner gear 12d is maintained even when the first barrel 14 moves in the direction of the optical axis 0 due to the rotation of the rotational ring 12. A gear train 31 including a final gear 31a and relay gears 31b and 31c is supported between the gear supporting plates 26 and 27 to receive the rotation of the pinion 30, and a rotation transmitting shaft 32 is integrally formed with the final gear 31a. The shaft 32 has a constant cross section which is not round.

Figure 5:
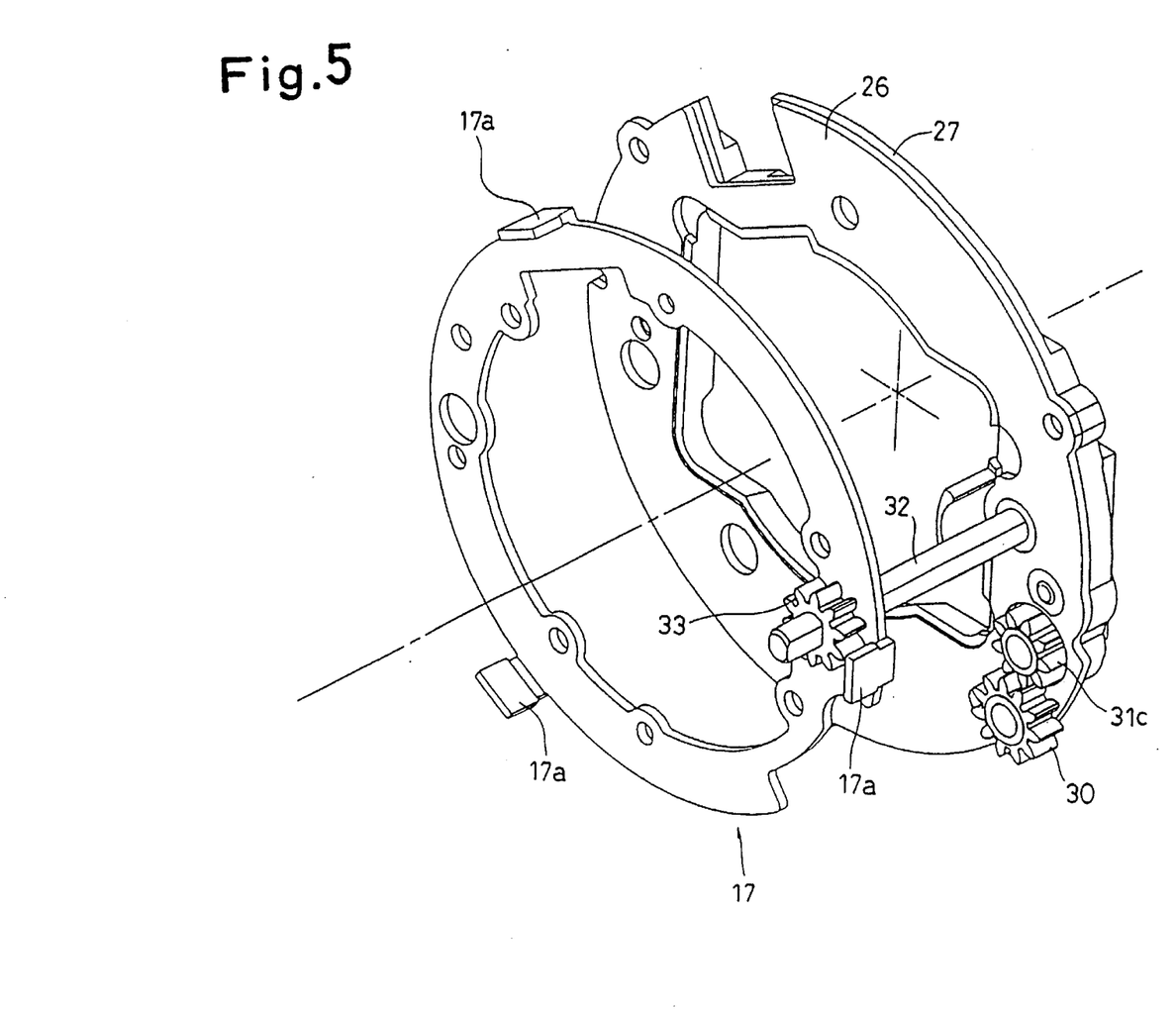
FIG. 5 is an isometric view of a supporting mechanism for a driving system of the zoom lens barrel block.
Figure 6:
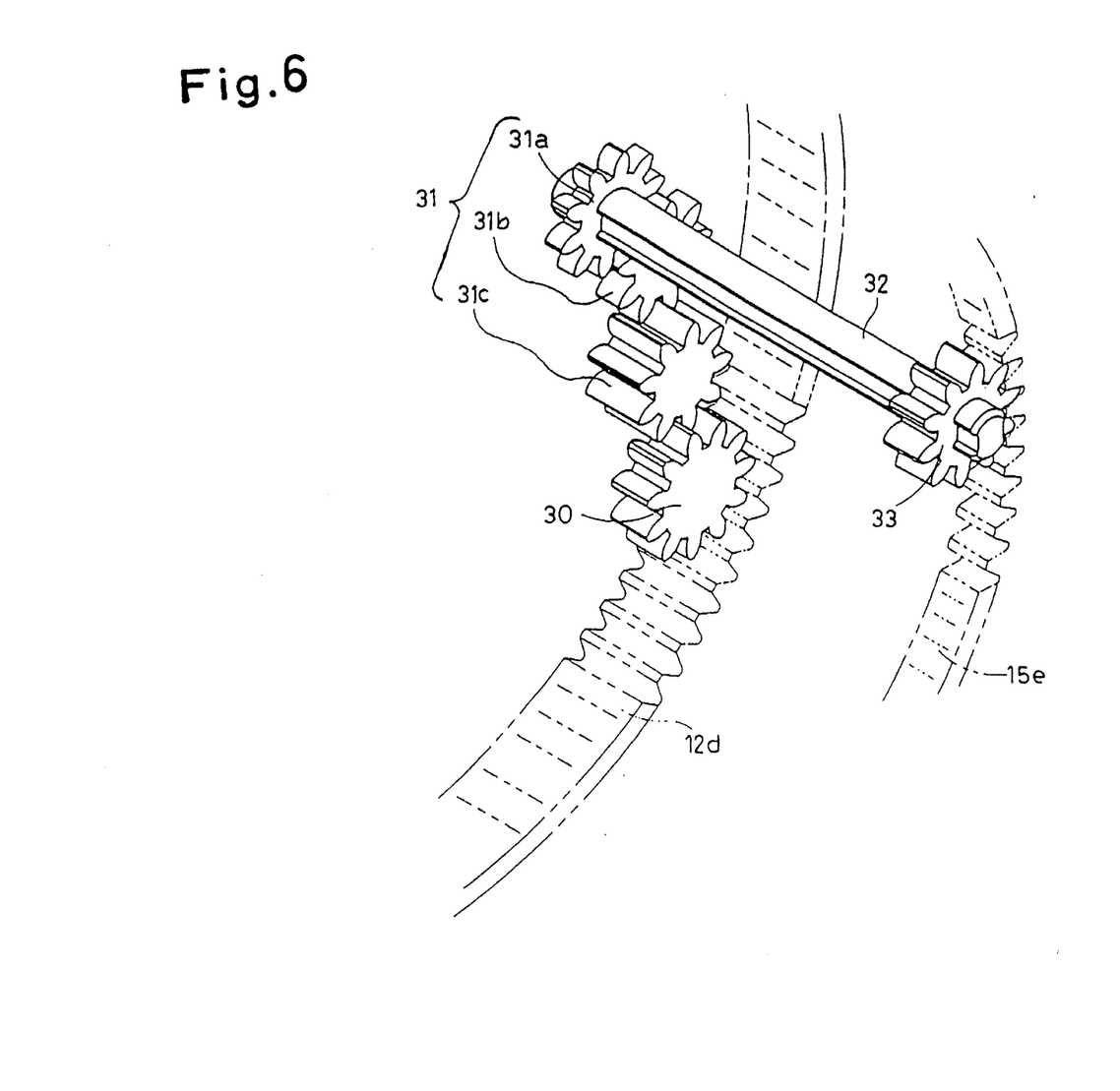
FIG. 6 is an isometric view of gears of the driving system.

A pinion 33 is supported on the guide plate 17 fixed to the rear end surface of the guide member 16 in the vicinity of one of the keys 17a of the guide plate 17 as illustrated in FIG. 5. The pinion 33 fits on the shaft 32 such that the pinion 33 is slidable on the shaft 32 in the axial direction thereof, but does not rotate with respect to the shaft 32. In other words, the pinion 33 is movable with respect to the shaft 32 in the axial direction thereof and rotatable together with the shaft 32. Thus, the pinion 33 moves along the shaft 32 together with the guide plate 17 (and the second barrel 15) when the second barrel 15 moves in the direction of the optical axis 0. The pinion 33 meshes a circumferential inner gear 15e which is formed on the inner surface of the second barrel 15. Therefore, the rotation of the rotational ring 12 is transmitted to the second barrel 15 through the inclined inner gear 12d, the pinion 30, the gear train 31, the rotation transmitting shaft 32, the pinion 33 and the circumferential inner gear 15e, regardless of the position of the first barrel 14 in the direction of the optical axis 0.

In the zoom lens barrel block with the above construction according to the present invention, when the rotational ring 12 is rotated, the first barrel 14 moves in the direction of the optical axis 0 and the second barrel 15 rotates. The rotation of the second barrel 15 allows the second barrel 15 to move in the direction of the optical axis 0, and the front lens group L1 and the rear lens group L2 to linearly move while changing the distance therebetween to thereby effect zooming.

Figure 9:
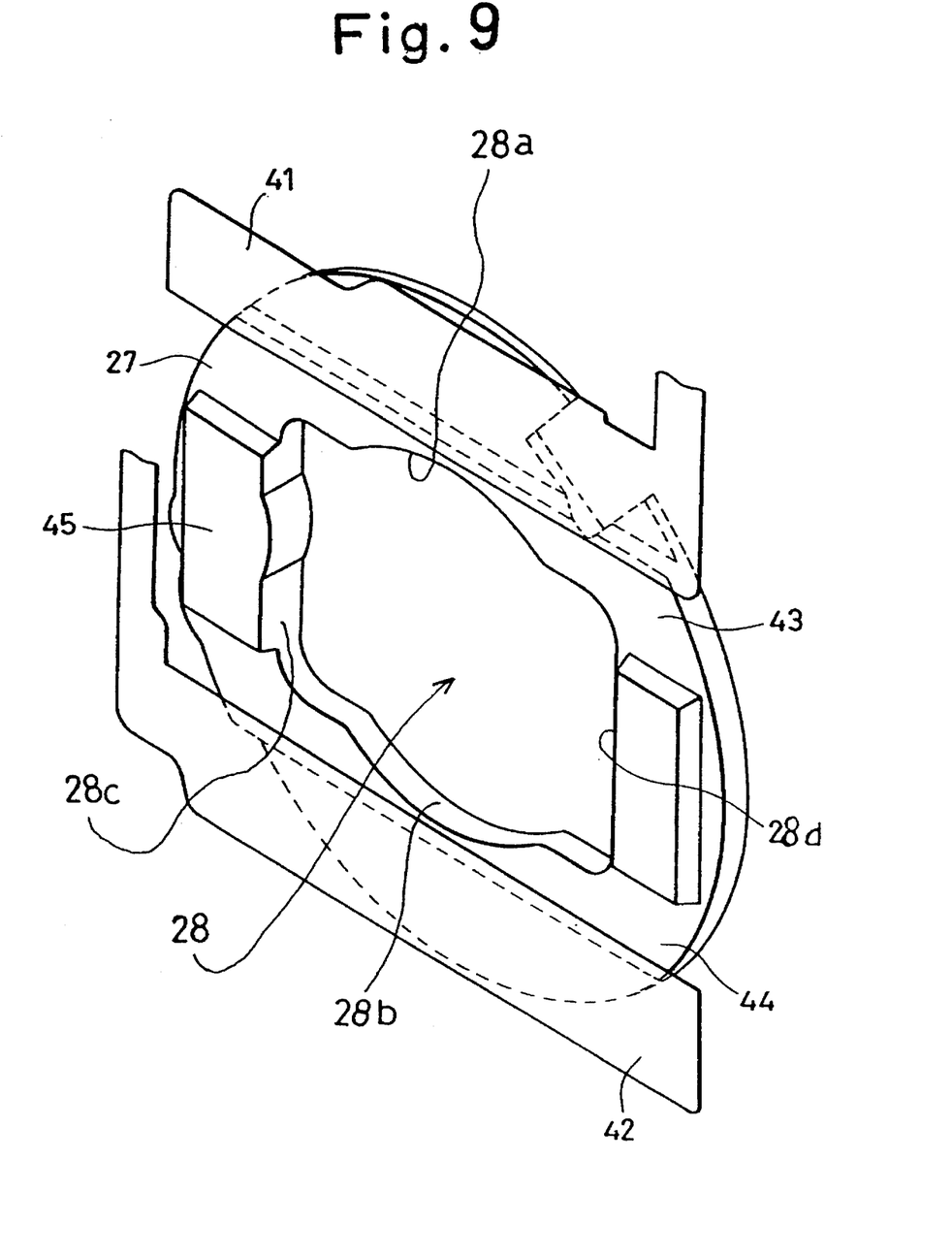
FIG. 9 is an isometric view of a pair of light intercepting plates as and a gear supporting plate, seen from the film side when the zoom lens barrel is retracted and a standard size aperture is selected.
Figure 10:
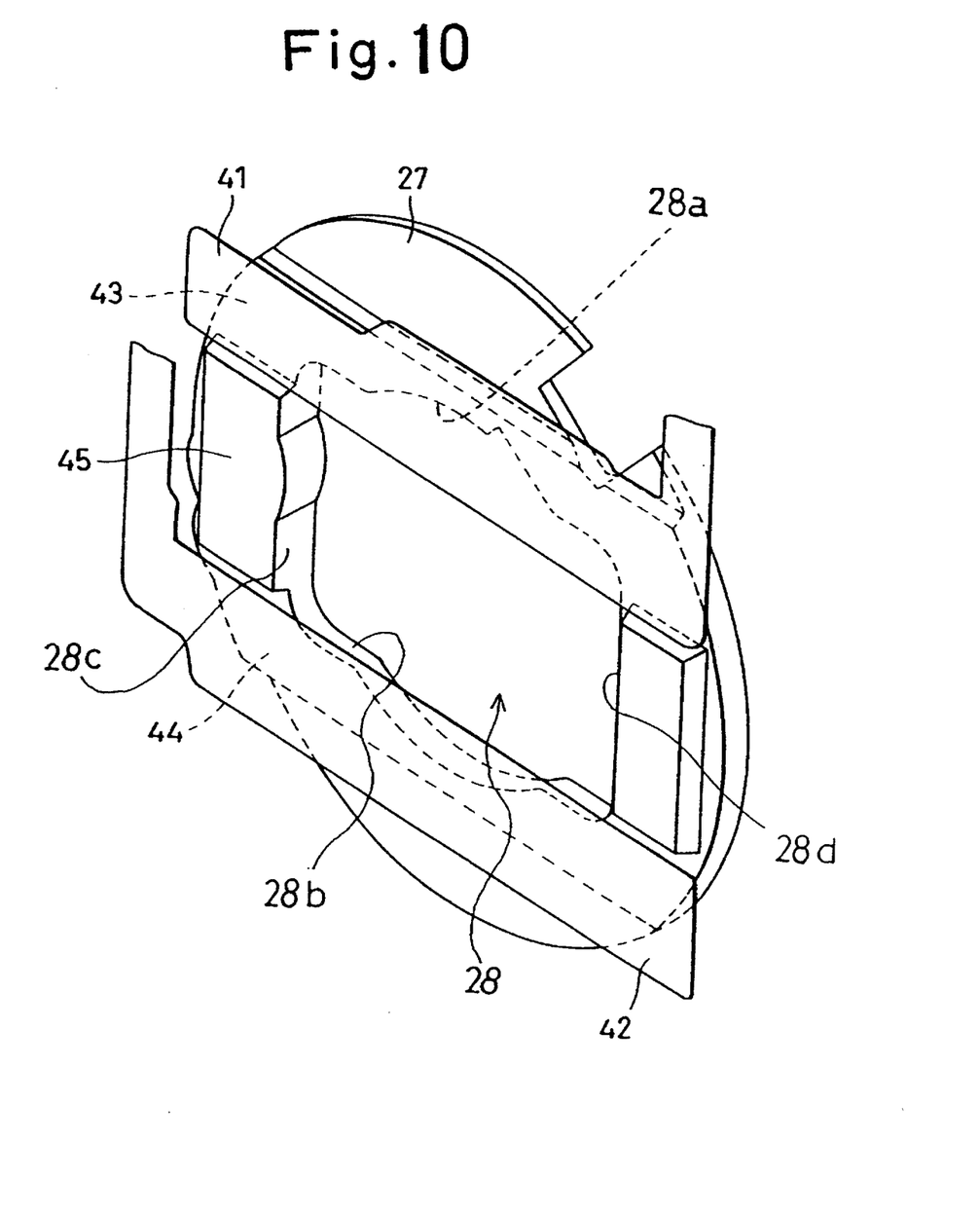
FIG. 10 is an isometric view of a pair of light intercepting plates as and a gear supporting plate, seen from the film side when the zoom lens barrel is retracted and a panoramic size aperture is selected; and, FIG. 11 is an elevational view of a pair of light intercepting plates, a gear supporting plate, and a gear train, as seen from the object side, for showing the relative positional relationship.

The camera (not shown) having the above-described zoom lens barrel block of the present invention is provided with an aperture size changing mechanism. The aperture size changing; and mechanism is a commonly known type and has a pair of upper and lower light intercepting plates 41 and 42 which are inserted into and retracted from a rectangular-shaped photographing aperture (not shown) of the camera body that defines a standard size aperture (24 mm×36 mm). When the upper and lower plates 41 and 42 are retracted away from the aperture, the standard size aperture is selected. When the upper and lower plates 41 and 42 are inserted into the aperture, a panoramic size aperture (13 mm×36 mm) is selected. FIGS. 9 and 10 show the positional relationship between the pair of light intercepting plates 41 and 42 and the gear supporting plate 27. FIG. 9 shows a state in which the pair of light intercepting plates 41 and 42 are retracted away from the aperture to select the standard size aperture, and FIG. 10 shows a state in which the pair of light intercepting plates 41 and 42 are inserted into the aperture to select the panoramic size aperture.

As shown in FIGS. 9 and 10, the pair of upper and lower light intercepting plates 41 and 42 are placed behind the gear supporting plate 27. The pair of plates 41 and 42 are also placed immediately before the photographing aperture (not shown). The retracting and inserting operation of the pair of upper and lower light intercepting plates 41 and 42 is done by manually operating a select switch (not shown) provided on the camera body. The gear supporting plates 26 and 27 have a central opening 28 which is formed by upper and lower long edges 28a and 28b and left and right short edges 28c and 28d, corresponding to upper and lower long edges and left and right short edges of the photographing aperture (not shown), respectively. A driving mechanism which moves the pair of upper and lower light intercepting plates 41 and 42 is well known and is therefore not illustrated and the explanation thereof is omitted.

Figure 3:
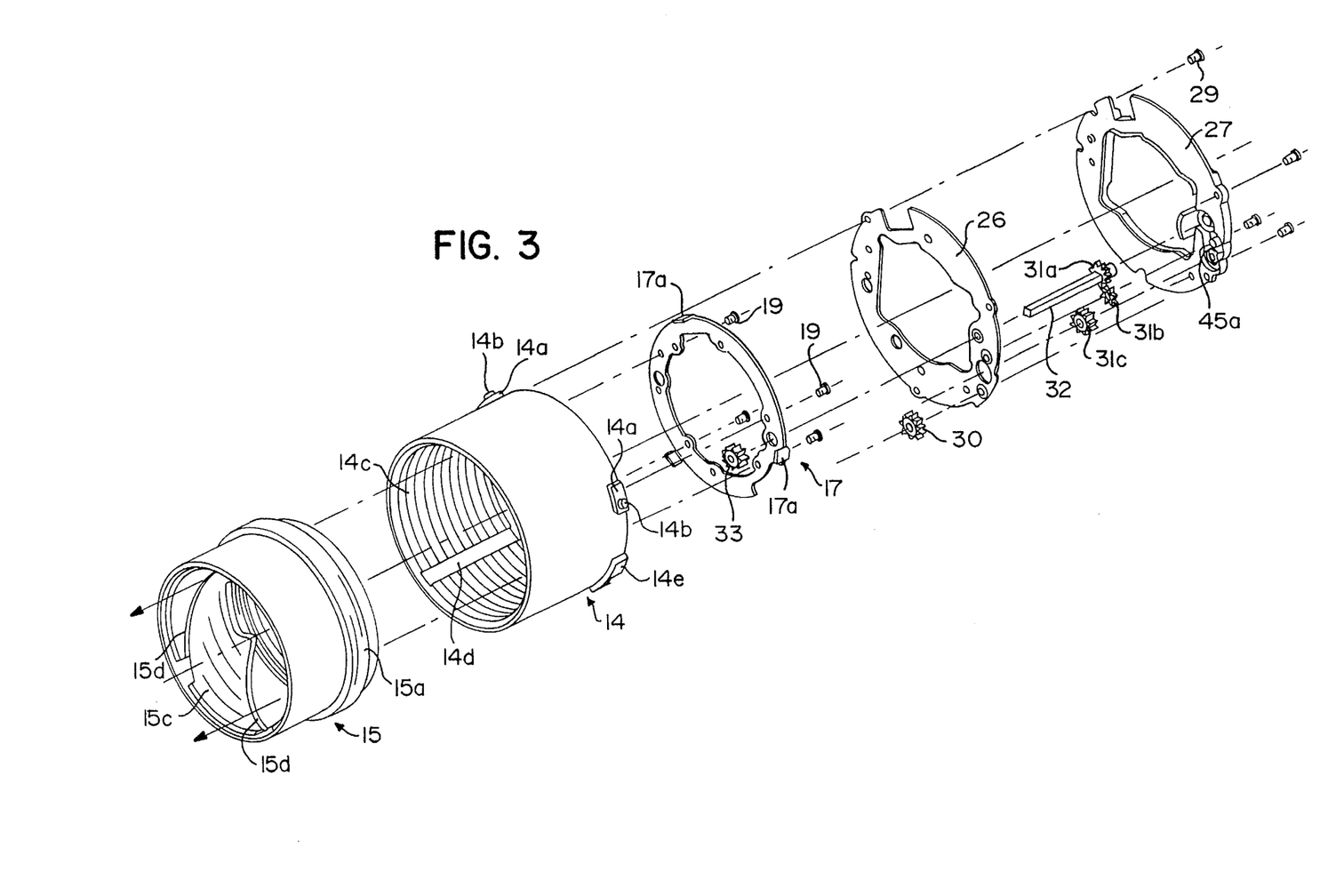
FIG. 3 is an enlarged isometric view of the intermediate portion of the zoom lens barrel block shown in FIG. 1.
Figure 4:
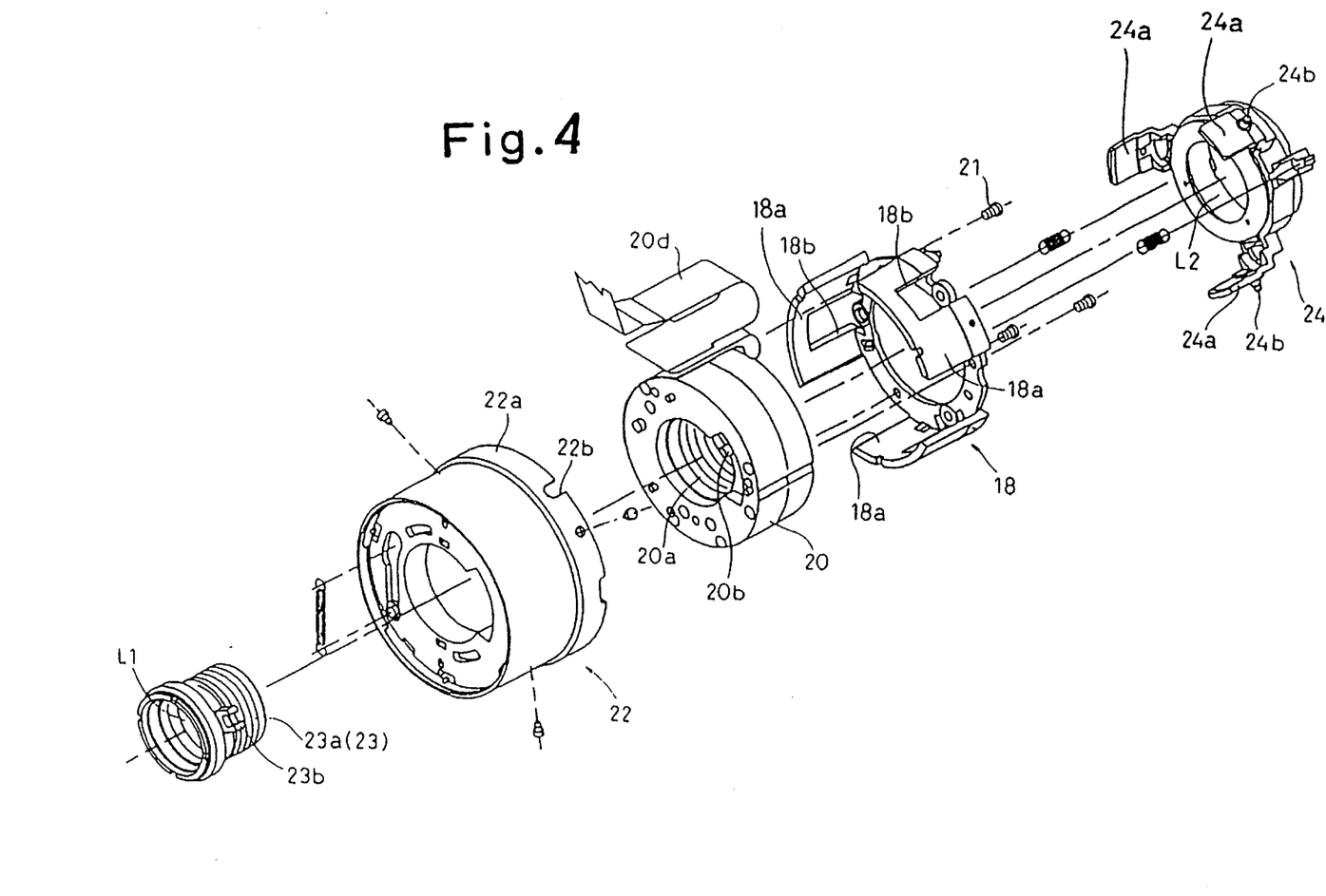
FIG. 4 is an enlarged isometric view of the front portion of the zoom lens barrel block shown in FIG. 1.
Figure 11:
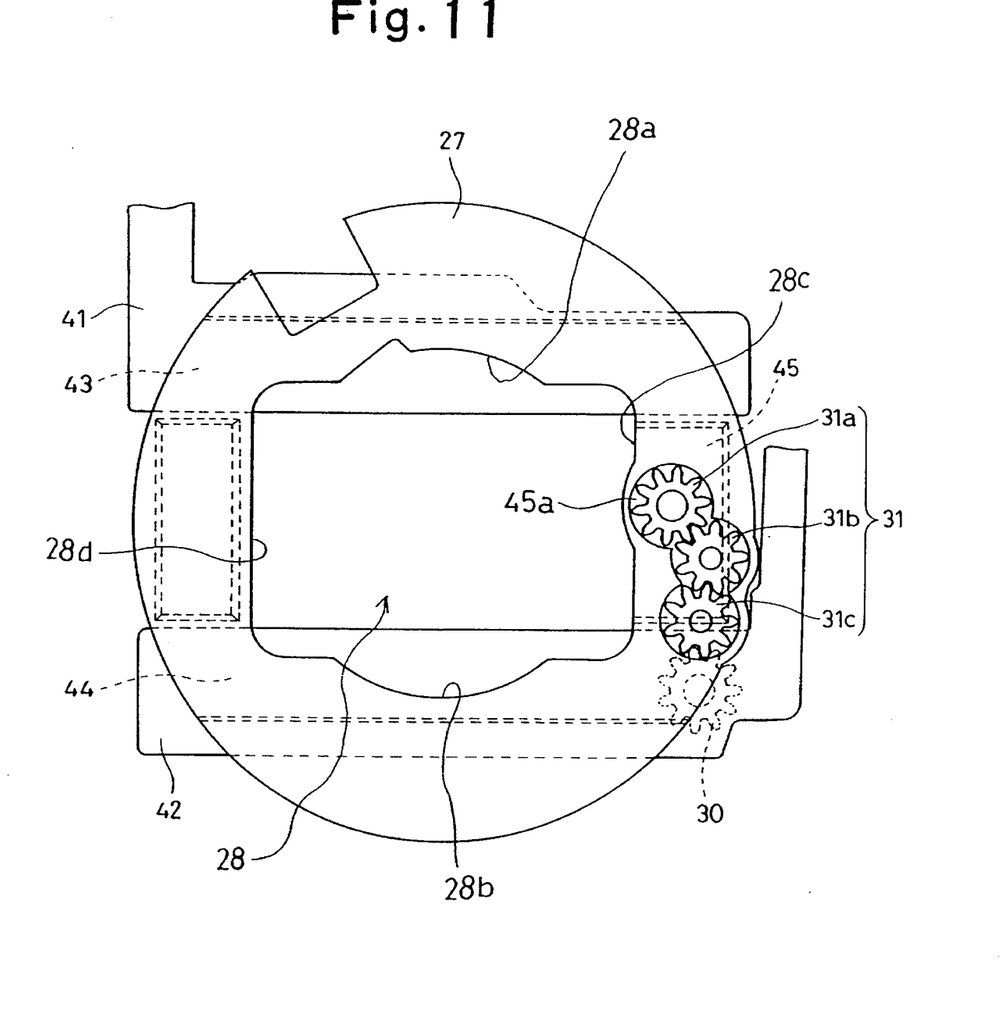

As shown in FIGS. 9 and 10, the gear supporting plate 27 is provided above and below the opening 28 with light intercepting plate leading passages (i.e., recessed portions) 43 and 44, respectively, which are formed to correspond to the shape and moving range of the pair of upper and lower light intercepting plates 41 and 42, so that the light intercepting plates 41 and 42 may not bump against the gear supporting plate 27 when the zoom lens barrel is retracted in the camera body, i.e., when the gear supporting plate 27 is placed at its closest position to the film plane (not shown). The gear supporting plate 27 is also provided on a left side portion thereof with a raised portion 45 along the left short edge 28c between the light intercepting plate leading passages 43 and 44. As shown in FIGS. 3 and 11, the gear train 31 is supported by the gear supporting plate 27 on the raised portion 45 (i.e., on the object side of the raised portion 45). More specifically, the gear train 31 is supported by the gear supporting plate 27 in a space 45a which is formed on the front of the raised portion 45 and recessed toward the side of the film plane. In the state shown in FIG. 10, the raised portion 45 and the pair of upper and lower light interrupting plates 41 and 42 are placed in a common imaginary plane perpendicular to the optical axis 0.

With the above construction, the gear train 31 is supported on the portion of the gear supporting plate 27 (i.e., the raised portion 45), the portion being formed such that the orthographic projection of the portion does not overlap the pair of upper and lower light intercepting plates 41 and 42 in the optical axis direction 0. Therefore, it is possible to have the gear train 31 retract to its retracted position which is much closer to the position of the film plane when the zoom lens barrel is retracted in the camera body, as compared with the case not having the raised portion 45. Consequently, it is possible to have the gear block, including the pair of upper and lower light intercepting plates 41 and 42, retract back to the retracted position, which is much closer to the position of the film plane when the zoom lens barrel is retracted into the camera body.

As can be seen from the foregoing, according to the present invention, it is possible to have the gear supporting member retract back to its retracted position, which is quite close to the position of the film plane when the zoom lens barrel is retracted in the camera body. Accordingly, it is possible to make the thickness of the camera quite small, i.e., to make the camera quite compact when the camera is not in use.

We claim:

1. A camera having a zoom lens barrel, comprising:

an aperture size changing mechanism including a pair of light intercepting members which are inserted into and retracted from a rectangular-shaped photographing aperture of said camera for changing a photographing aperture size;

a non-rotational barrel which moves in a direction of an optical axis of the zoom lens without rotating;

a rotational barrel which is driven to rotate with respect to said non-rotational barrel about said optical axis;

a gear supporting member which is secured at the rear end of said non-rotational barrel, said gear supporting member having a central opening and a raised portion projecting toward said photographing aperture, wherein said raised portion is formed such that an orthographic projection thereof in said optical axis direction may not overlap said pair of light intercepting members; and, a gear train for transmitting a drive force to said rotational barrel, wherein at least a part of said gear train is supported by said raised portion.

2. The camera of claim 1, wherein said gear supporting member comprises a pair of long edges and a pair of short edges which form said central opening, said pair of long edges and said pair of short edges corresponding to a pair of long edges and a pair of short edges of said photographing aperture, wherein said at least a part of said gear train is supported along either of said pair of short edges of said gear supporting member.

3. The camera of claim 2, wherein said gear supporting member comprises a pair of recessed portions which are located on upper and lower portions of said raised portion, for allowing said pair of light intercepting members to move in and out of said pair of recessed portions so that said pair of light intercepting members may not bump against said gear supporting member.

4. The camera of claim 3, wherein said raised portion has a space therein, said at least a part of said gear train being supported in said space.

5. The camera of claim 1, wherein said raised portion has a space therein, said at least a part of said gear train being supported in said space.

6. The camera of claim 1, further comprising a male helicoid gear and a female helicoid gear formed on an outer periphery of said rotational barrel and an inner periphery of said non-rotational barrel, respectively, said male helicoid gear engaging with said female helicoid gear.

7. A lens-shutter type camera having a zoom lens incorporated therein, comprising:

an aperture size changing mechanism including a pair of light intercepting members which are inserted into and retracted from a photographing aperture of said camera for changing a photographing aperture size; and, a zoom lens barrel moving in a direction of an optical axis of said zoom lens between an extended position and a retracted position;

said zoom lens barrel further comprising a non-rotational barrel moving in said optical axis direction without rotating with respect to said camera, a rotational barrel driven to rotate with respect to said non-rotational barrel about said optical axis, a gear supporting member fixed to a rear end of said non-rotational barrel, and a gear train supported on said gear supporting member for transmitting a drive force to said rotational barrel, wherein at least a part of said gear train is supported in a raised portion formed on said gear supporting member, said raised portion projecting toward said photographing aperture so that said raised portion may not bump against said pair of light intercepting members when said zoom lens barrel retracts to said retracted position.

8. A lens-shutter type camera of claim 7, wherein said raised portion and said pair of light intercepting members are placed in a common imaginary plane perpendicular to said optical axis when said zoom lens barrel is placed at said retracted position.

* * * * *